(12) United States Patent
Hashiguchi

(10) Patent No.: US 8,038,355 B2
(45) Date of Patent: Oct. 18, 2011

(54) CONNECTOR

(75) Inventor: Osamu Hashiguchi, Tokyo (JP)

(73) Assignee: Japan Aviation Electronics Ind., Ltd., Tokyo (JP)

( * ) Notice: Subject to any disclaimer, the term of this patent is extended or adjusted under 35 U.S.C. 154(b) by 0 days.

(21) Appl. No.: 12/326,924

(22) Filed: Dec. 3, 2008

(65) Prior Publication Data

US 2009/0148107 A1 Jun. 11, 2009

(30) Foreign Application Priority Data

Dec. 6, 2007 (JP) .................. 2007-316161

(51) Int. Cl.
G02B 6/38 (2006.01)

(52) U.S. Cl. ........................................ 385/75

(58) Field of Classification Search .................. 385/53, 385/55, 75, 88, 92
See application file for complete search history.

(56) References Cited

U.S. PATENT DOCUMENTS

| | | | |
|---|---|---|---|
| 6,921,298 B2* | 7/2005 | Sasaki | 439/700 |
| 7,575,471 B2* | 8/2009 | Long | 439/541.5 |
| 2003/0211782 A1* | 11/2003 | Esparaz et al. | 439/620 |
| 2004/0132491 A1* | 7/2004 | Kim et al. | 455/556.1 |

FOREIGN PATENT DOCUMENTS

| | | |
|---|---|---|
| JP | 3084012 U | 11/2001 |
| JP | 2004-185853 A | 7/2004 |
| JP | 2007-287350 A | 11/2007 |

OTHER PUBLICATIONS

Third Party Submission under 37 CFR 1.99, submitted to the USPTO on Aug. 6, 2009, in connection with the present U.S. Appl. No. 12/326,924.

* cited by examiner

*Primary Examiner* — Jennifer Doan

(74) *Attorney, Agent, or Firm* — Holtz, Holtz, Goodman & Chick, P.C.

(57) ABSTRACT

A connector which makes it easy to view light from a light source. A light guide 7 guides light from LEDs 21 forward of the housing 5 in a fitting direction. The light guide 7 is configured to be mounted on the housing 5 that hold contacts 3, in a manner covering the same.

10 Claims, 18 Drawing Sheets

CONNECTOR

BACKGROUND OF THE INVENTION

1. Field of the Invention

This invention relates to a connector.

2. Description of the Related Art

Conventionally, there has been proposed a connector with a display function, which is comprised of a housing, a terminal unit, a shield member, and two light guides (see Japanese Laid-Open Patent Publication (Kokai) No. 2007-287350).

The housing includes a bottom plate portion and side wall portions. Connecting portions for connecting the bottom plate portion and the side wall portions are formed with light guide-accommodating portions that accommodate the respective light guides. The light guide-accommodating portions extend in a direction in which the connector with the display function is fitted to a mating connector. One end of each light guide-accommodating portion reaches the front surface of the housing, and the other end thereof reaches the bottom surface of the housing. Therefore, the front end of the light guide-accommodating portion opens in the front surface of the housing, and the rear end thereof opens in the bottom surface of the housing.

The terminal unit includes a unit body, a terminal supporting portion, a plurality of terminals, a plurality of connecting pins, and a plurality of conductive wires. The unit body is made of an insulating material, such as a synthetic resin, and is substantially square in shape. The terminal supporting portion is shade-shaped, and protrudes from an upper portion of the front surface of the unit body. The terminals are bent such that they are generally V-shaped. Each terminal has one end supported by the terminal supporting portion, and the other end supported by the unit body. The connecting pins are supported by the unit body, and protrude from the bottom of the unit body. The connecting pins are inserted into a through hole of a printed circuit board, for being electrically connected to the printed circuit board. The conductive wires electrically connect the terminals and associated ones of the connecting pins. The terminal unit is accommodated in the housing between the side wall portions, and is fixed to the housing.

The shield member is made of metal, and covers the housing and the terminal unit. The shield member has a front surface formed with light guide openings that are opposed to openings each formed in one end of the light guide-accommodating portion.

Each light guide is generally prism-shaped, and is accommodated in the light guide-accommodating portion. A recess for accommodating an LED, which is a light source mounted on the printed circuit board, is formed in the rear end of the light guide in the direction of the length thereof. When the connector with the display function is mounted on the printed circuit board, the LEDs are accommodated in the associated recesses of the light guides via the openings formed in the rear ends of the light guide-accommodating portions, respectively.

The LED emits light, e.g. when the connector with the display function is connected to the mating connector, or when a signal is flowing through the connector with the display function and the mating connector. Light emitted from the LED enters the recess of the light guide, and is emitted from the foremost end face of the light guide in the direction of the length thereof. This makes it possible to detect connection between the connector with the display function and the mating connector, or detect that a signal is flowing.

In the above-described connector, since light is emitted from the foremost end face of the prism-shaped light guide in the direction of the length thereof, the area from which light is emitted is small, and hence the visibility of emitted light is low.

SUMMARY OF THE INVENTION

The present invention has been made in view of these circumstances, and an object thereof is to provide a connector which makes it easy to visually recognize light emitted from a light source.

To attain the above object, in a first aspect of the present invention, there is provided a connector comprising contacts, a housing that holds the contacts, and a light guide that is mounted on the housing in a manner covering the housing, for guiding light from a light source, forward of the housing in a fitting direction.

As described above, the light guide is disposed in a manner covering the housing, for guiding light from the light source, forward of the housing in the fitting direction, which cases the front end of the light guide in the fitting direction to shine.

Preferably, the light guide is removable from the housing.

To attain the above object, in a second aspect of the present invention, there is provided a connector comprising contacts, a housing that holds the contacts, a frame that covers the housing, and a light-transmissive portion that is supported by a front end of the frame in a fitting direction, for causing light emitted from a light source and introduced into a hollow cylindrical space formed between an outer peripheral surface of the housing and an inner peripheral surface of the frame, to pass forward of the housing in a fitting direction.

As described above, the light-transmissive portion causes light emitted from the light source and introduced into the gap between the housing and the frame, to pass forward of the housing in the fitting direction, which causes the front end of the frame in the fitting direction to shine.

Preferably, the frame is removable from the housing.

To attain the above object, in a third aspect of the present invention, there is provided a connector comprising contacts, a housing that holds the contacts, and a thin portion that is formed in the housing, for causing light from a light source to pass forward of the housing in a fitting direction.

As described above, the housing includes the thin portion for causing light from the light source to pass forward of the housing in the fitting direction, which causes the thin portion to shine.

According to the present invention, it is easy to visually recognize light from the light source.

The above and other objects, features and advantages of the present invention will become more apparent from the following detailed description taken in conjunction with the accompanying drawings.

DETAILED DESCRIPTION OF THE PREFERRED EMBODIMENTS

Figure 1:
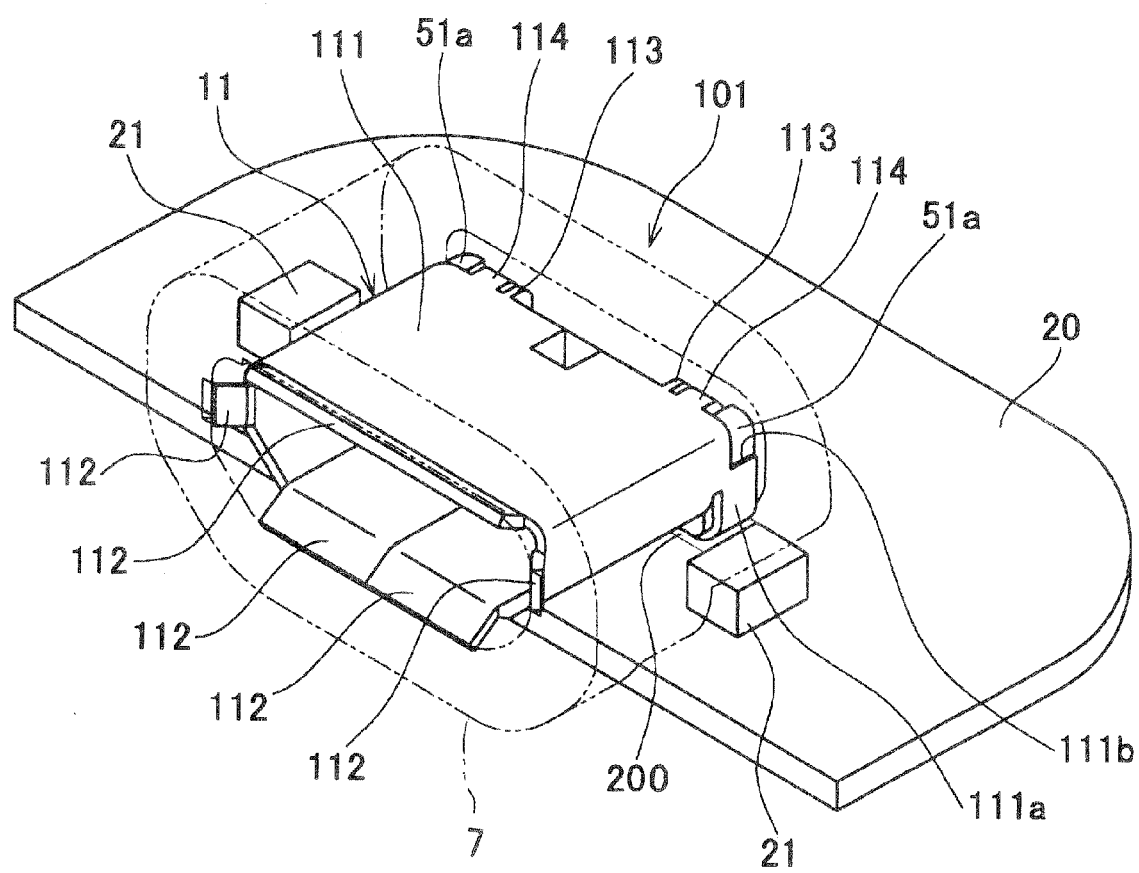
FIG. 1 is a perspective view of a connector according to a first embodiment of the present invention, in a state having a light guide removed therefrom.

The present invention will now be described in detail with reference to the drawings showing preferred embodiments thereof.

As shown in FIG. 1 and FIGS. 2A to 2E, a connector 101 is comprised of a plurality of contacts 3, a housing 5, a light guide 7, and a shield member 11. The connector 101 is provided for charging a cellular phone (not shown), for example, and is mounted on a printed circuit board 20. The printed circuit board 20 has two LEDs (light-emitting diodes) 21, which are light sources, mounted thereon. The LEDs 21 emit light in a direction perpendicular to a mounting surface 20a of the printed circuit board 20.

Each contact 3 includes a contact portion 3a, a terminal portion 3b, and a connecting portion (not shown), and is made of metal. The contact portion 3a is brought into contact with an associated one of mating contacts of a mating connector, not shown. The terminal portion 3b is soldered to an associated one of terminal pads (not shown) of the printed circuit board 20. The connecting portion connects the contact portion 3a and the terminal portion 3b.

The housing 5 includes a housing body 51 and a contact portion-holding portion 52, and is made of an insulating material. The housing body 51 has a generally rectangular parallelepiped shape. The connecting portion of the contact 3 is embedded in the housing body 51. The contact portion-holding portion 52 is connected to an upper portion of a front surface (face opposed to the mating connector) of the housing body 51. The contact portion-holding portion 52 extends in a fitting direction D in which the housing 5 is fitted in the mating connector. The contact portion-holding portion 52 holds the respective contact portions 3a of the contacts 3 at equally-spaced intervals. The housing body 51 has engaging protrusions 51a formed on a rear end thereof in the fitting direction D.

The light guide 7 includes a light guide body 71 and a protruding portion 72, and is made of a colorless and transparent acrylic resin.

Figure 2A:
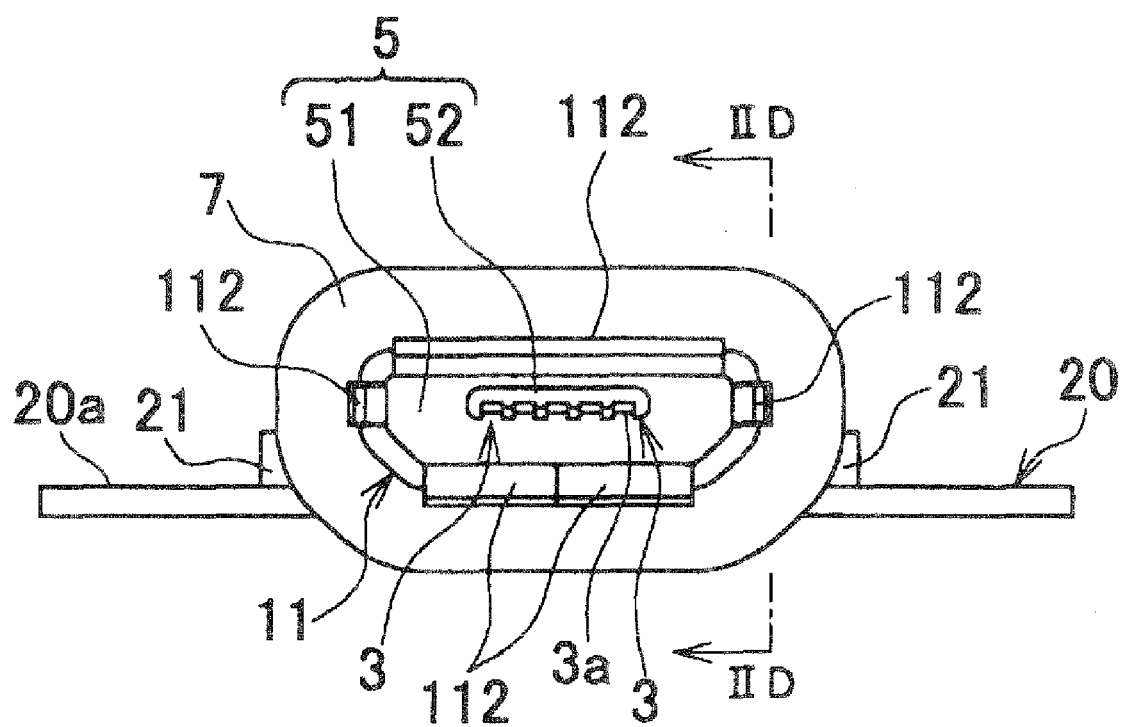
FIG. 2A is a front view of the FIG. 1 connector.
Figure 2B:
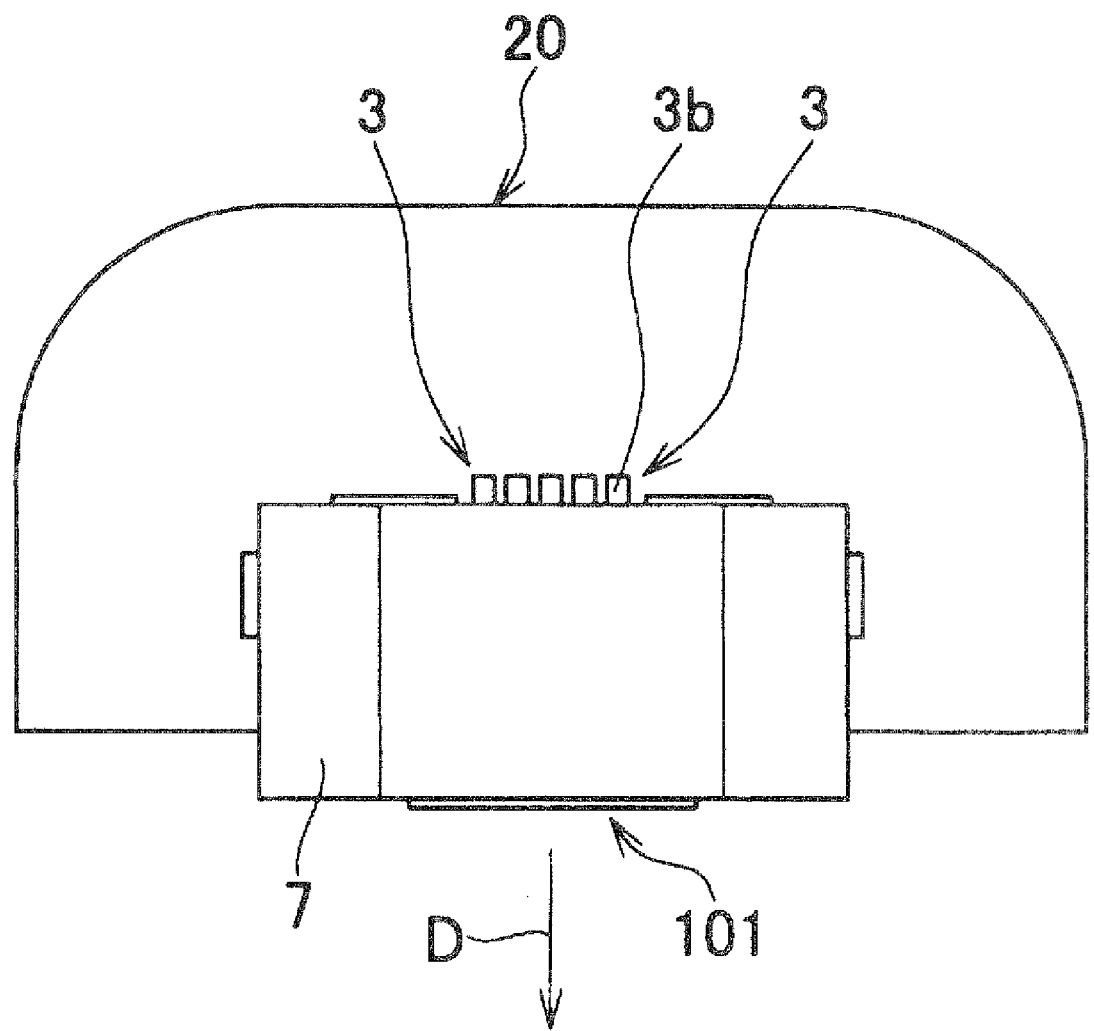
FIG. 2B is a plan view of the FIG. 1 connector.
Figure 2C:
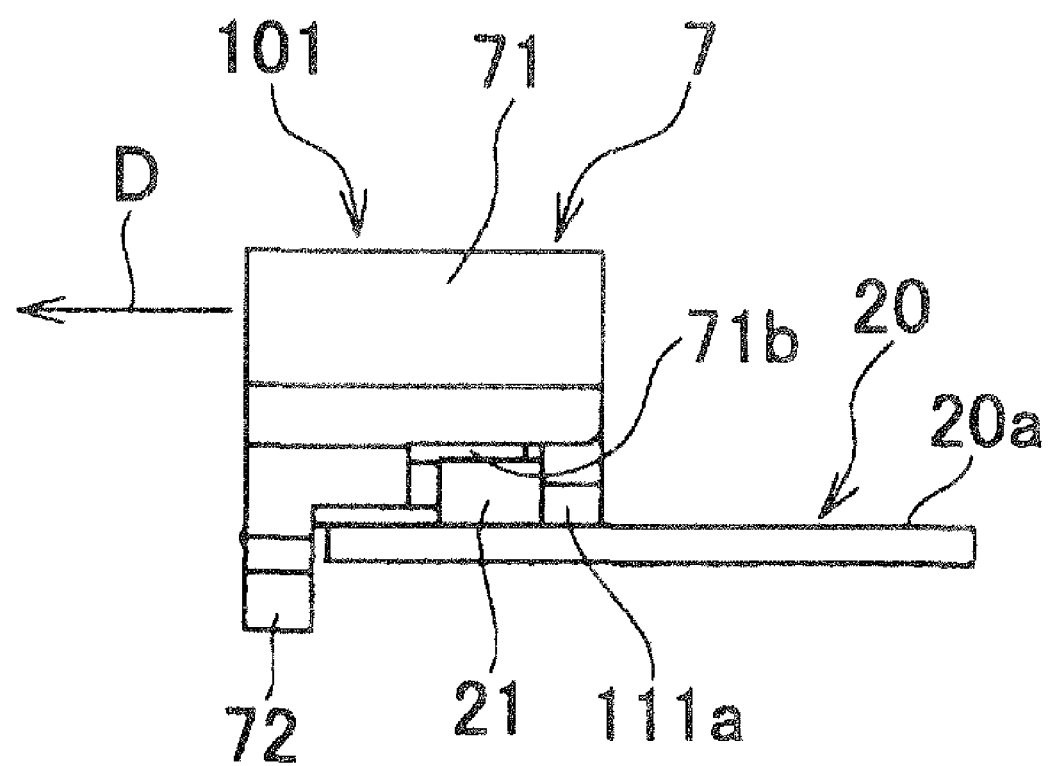
FIG. 2C is a side view of the FIG. 1 connector.
Figure 2D:
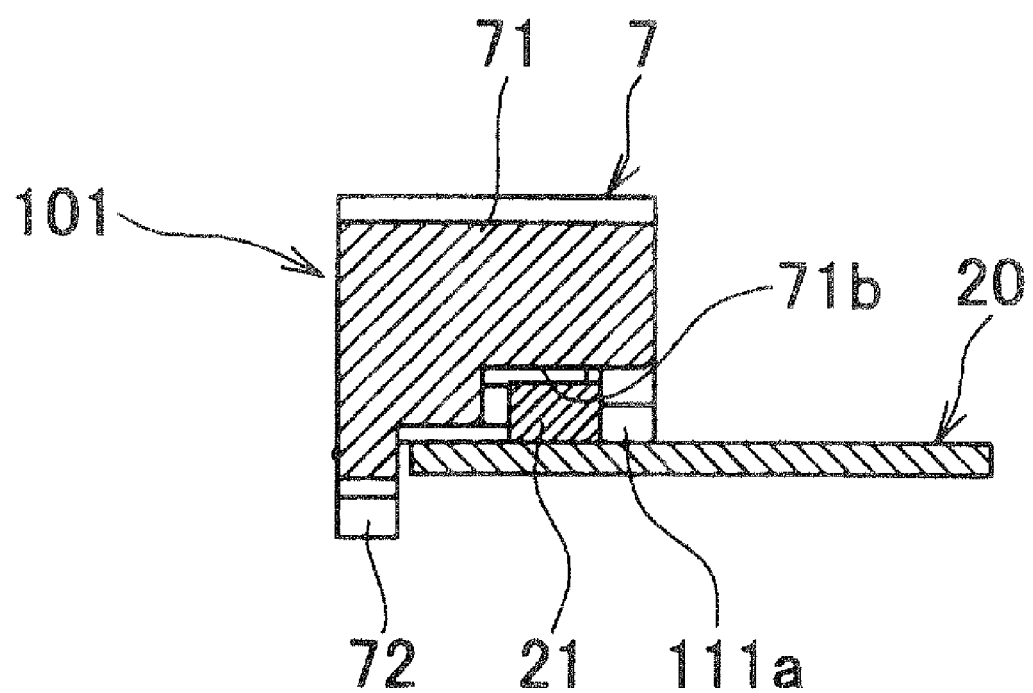
FIG. 2D is a cross-sectional view taken on line IID-IID of FIG. 2A.
Figure 2E:
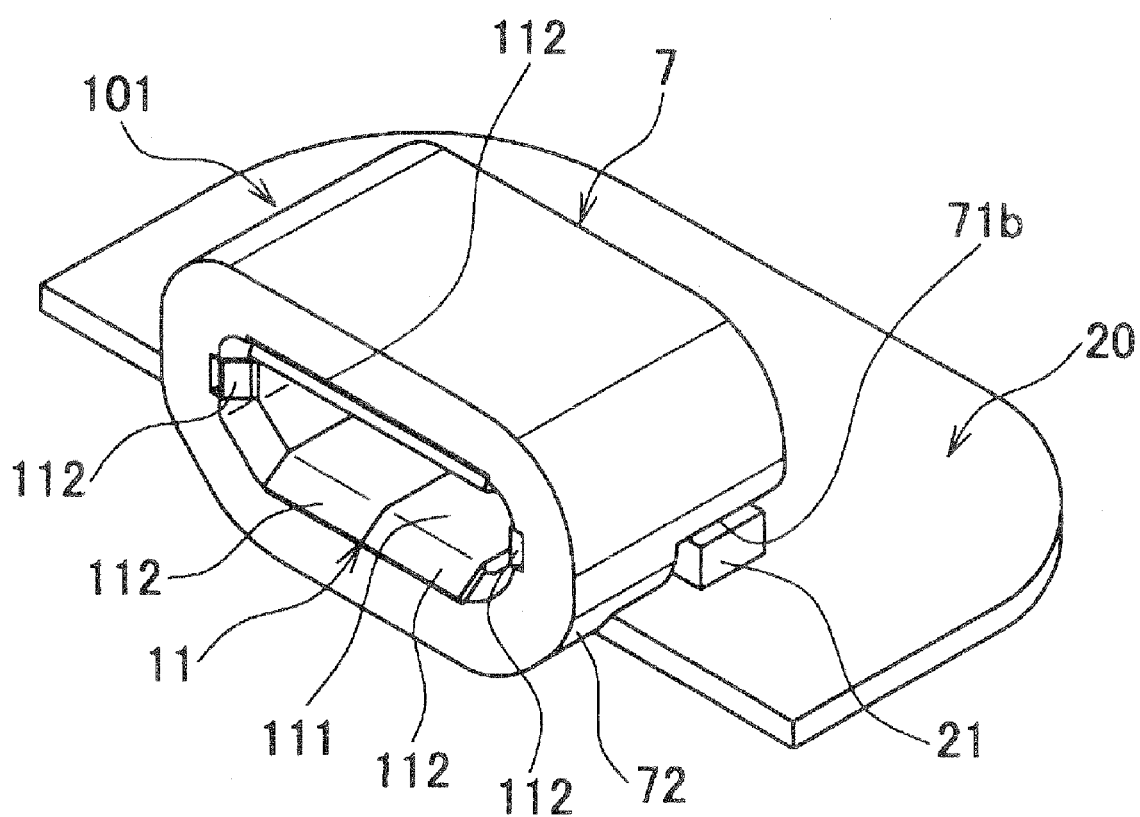
FIG. 2E is a perspective view of the FIG. 1 connector.
Figure 3:
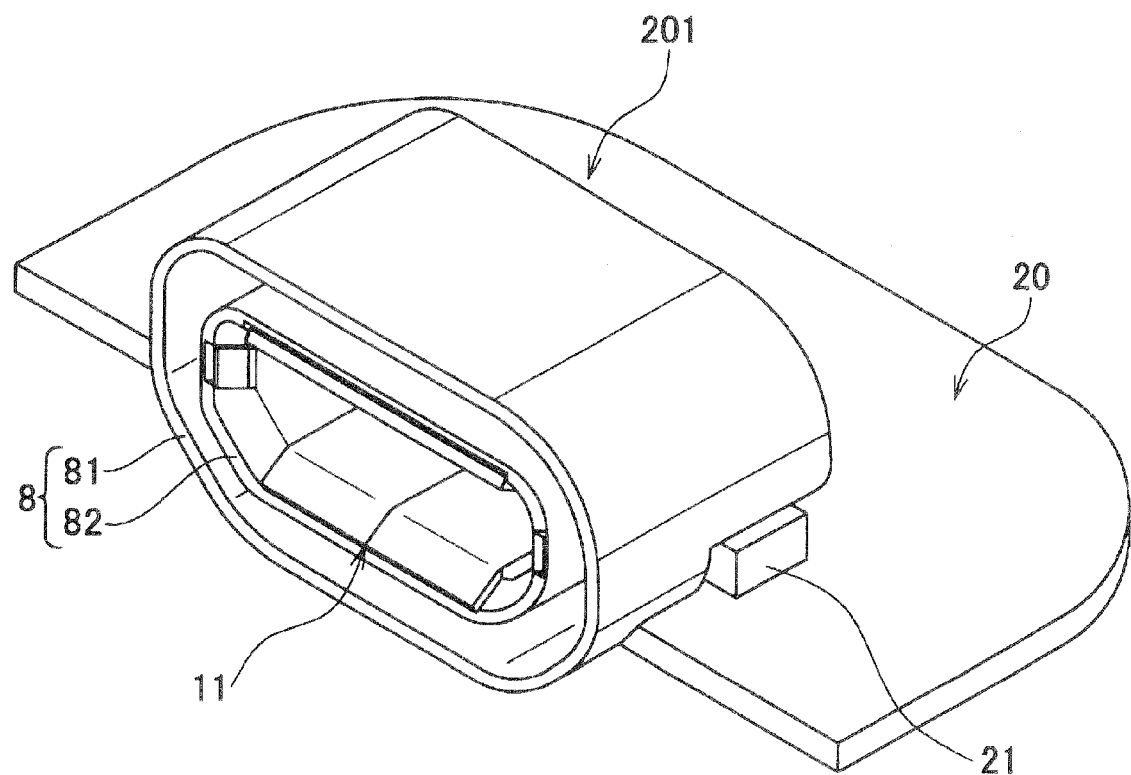
FIG. 3 is a perspective view of a connector according to a second embodiment of the present invention, in a state having a film removed therefrom.
Figure 4A:
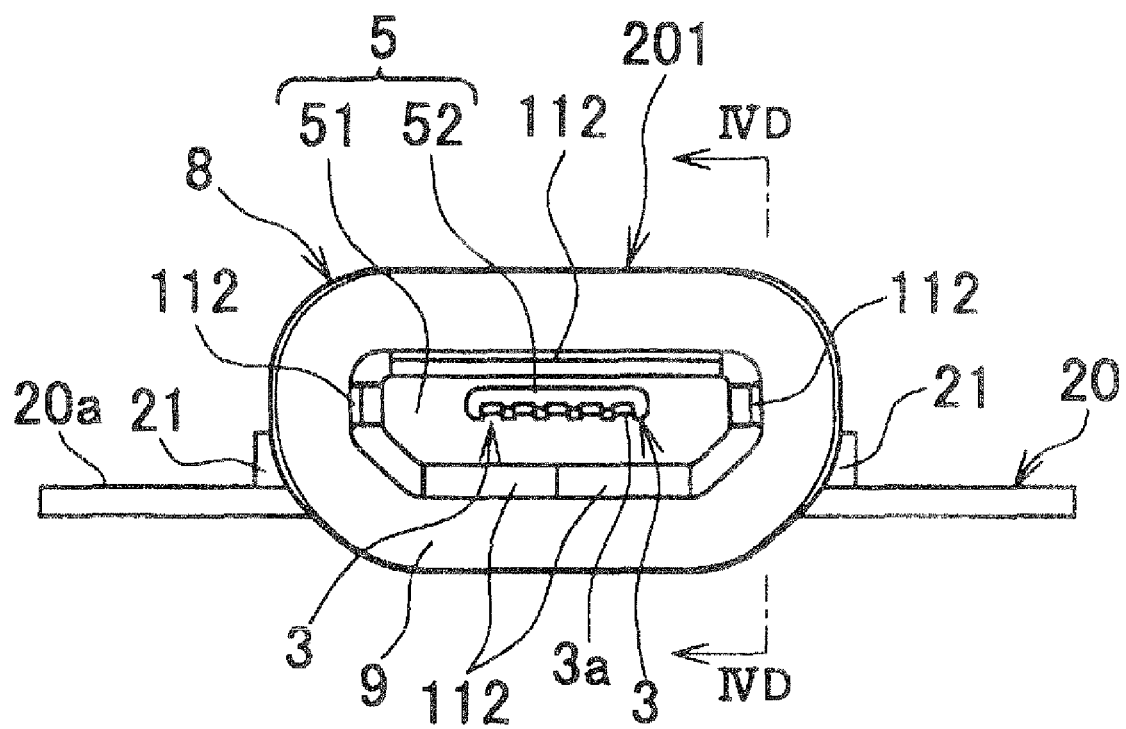
FIG. 4A is a front view of the FIG. 3 connector, in a state having the film mounted thereon.
Figure 4B:
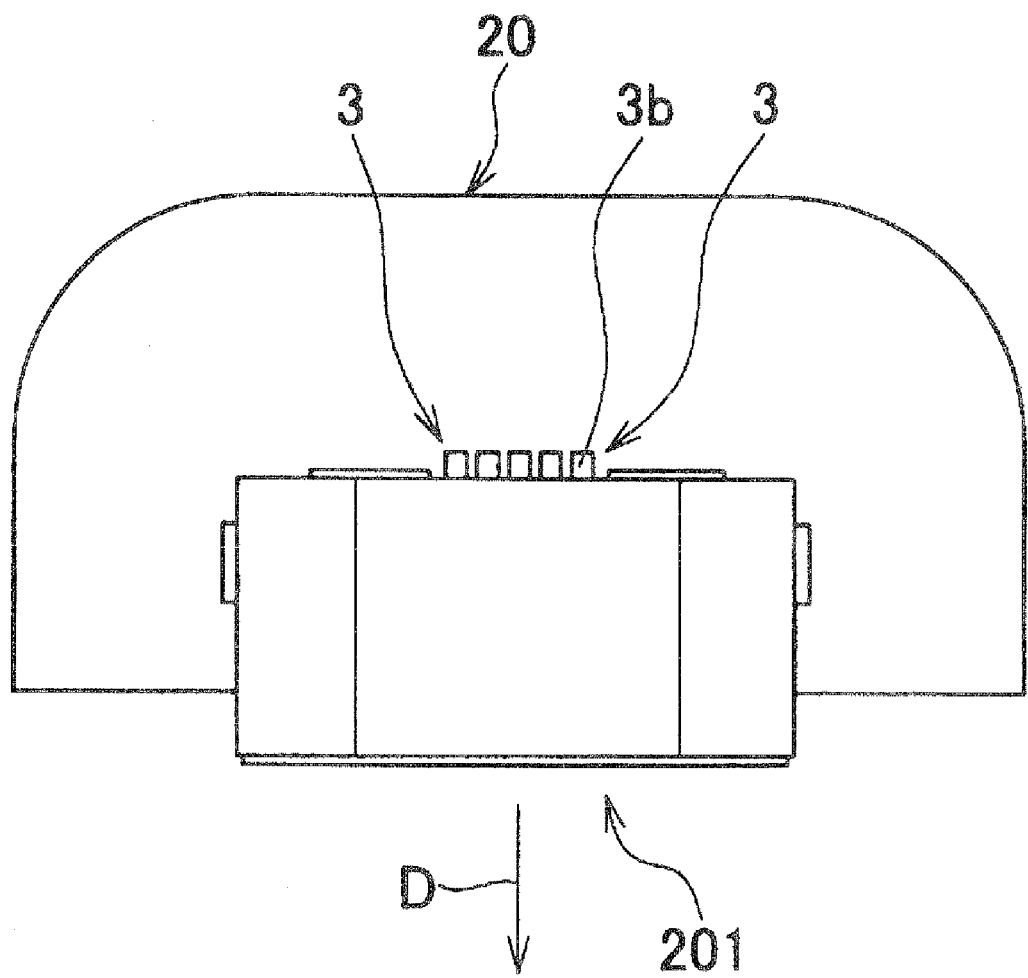
FIG. 4B is a plan view of the FIG. 4A connector.
Figure 4C:
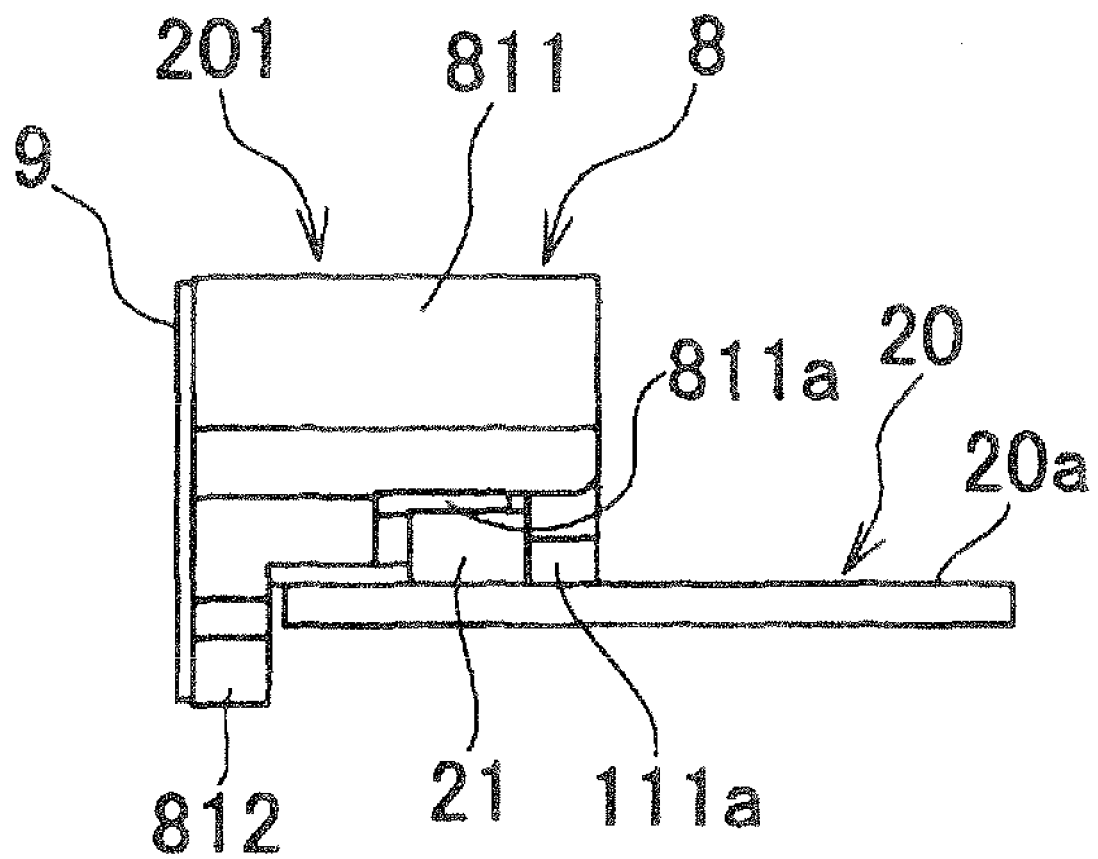
FIG. 4C is a side view of the FIG. 4A connector.
Figure 4D:
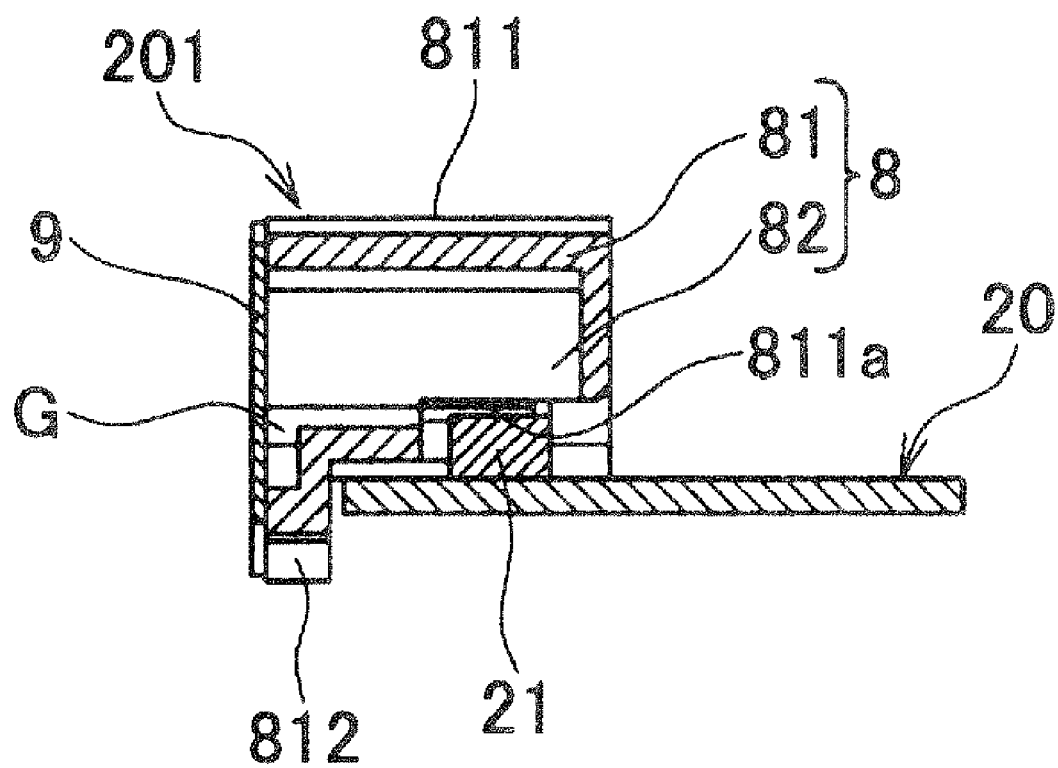
FIG. 4D is a cross-sectional view taken on line IVD-IVD of FIG. 4A.
Figure 4E:
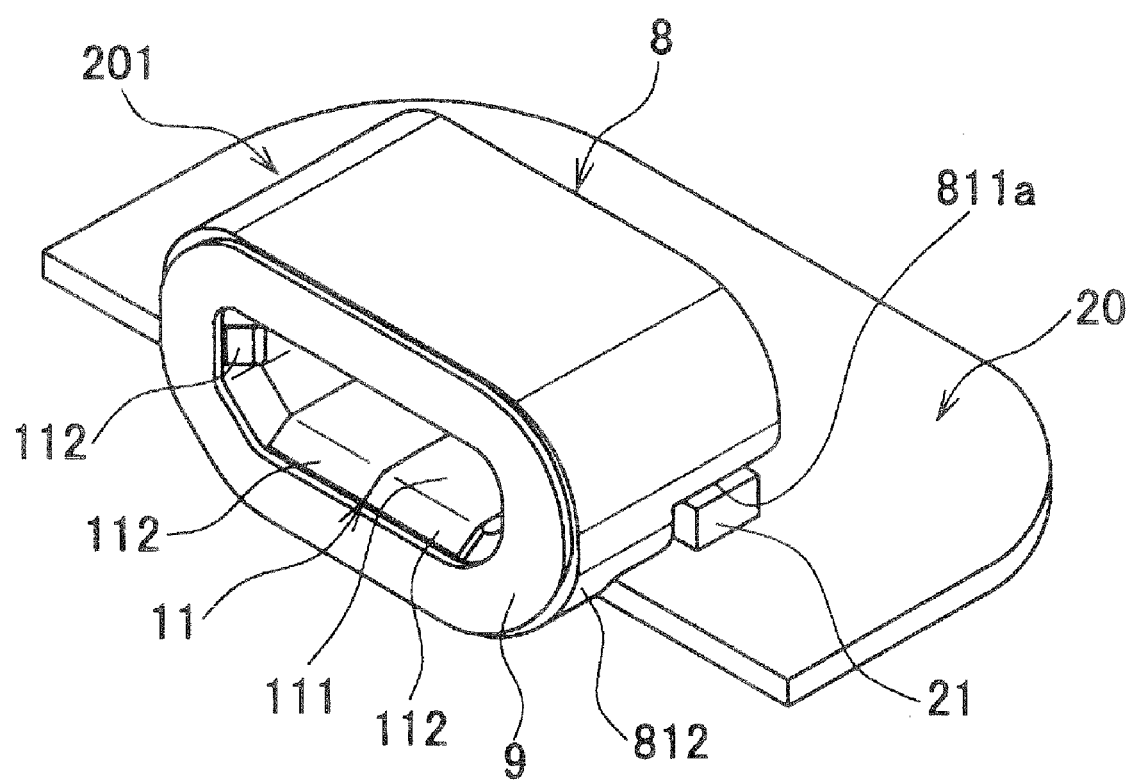
FIG. 4E is a perspective view of the FIG. 4A connector.
Figure 5:
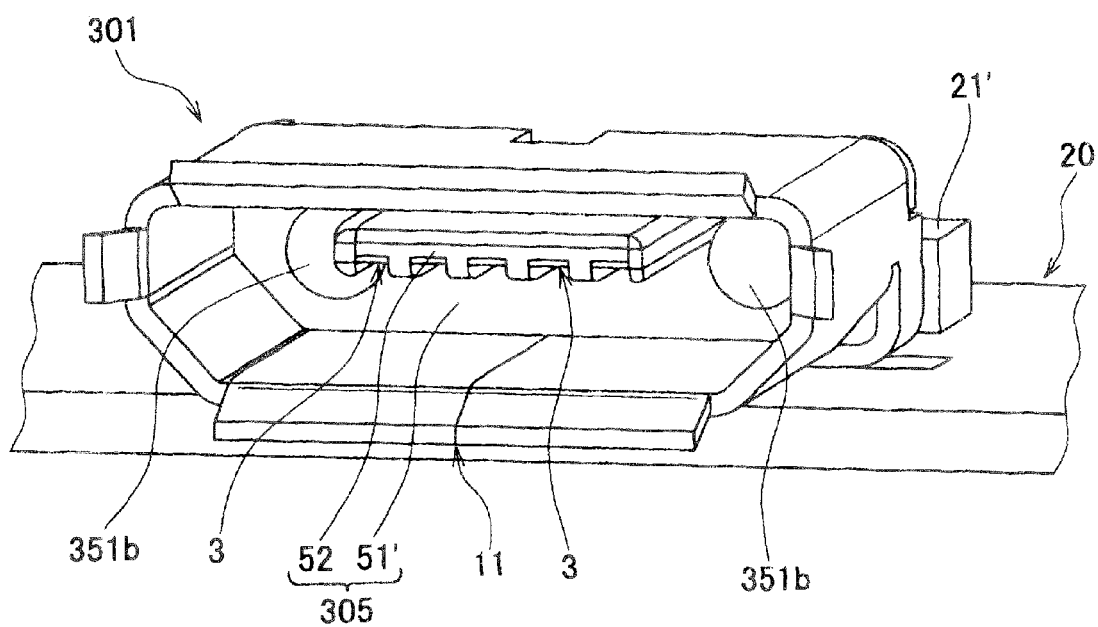
FIG. 5 is a perspective view of a connector according to a third embodiment of the present invention.
Figure 6A:
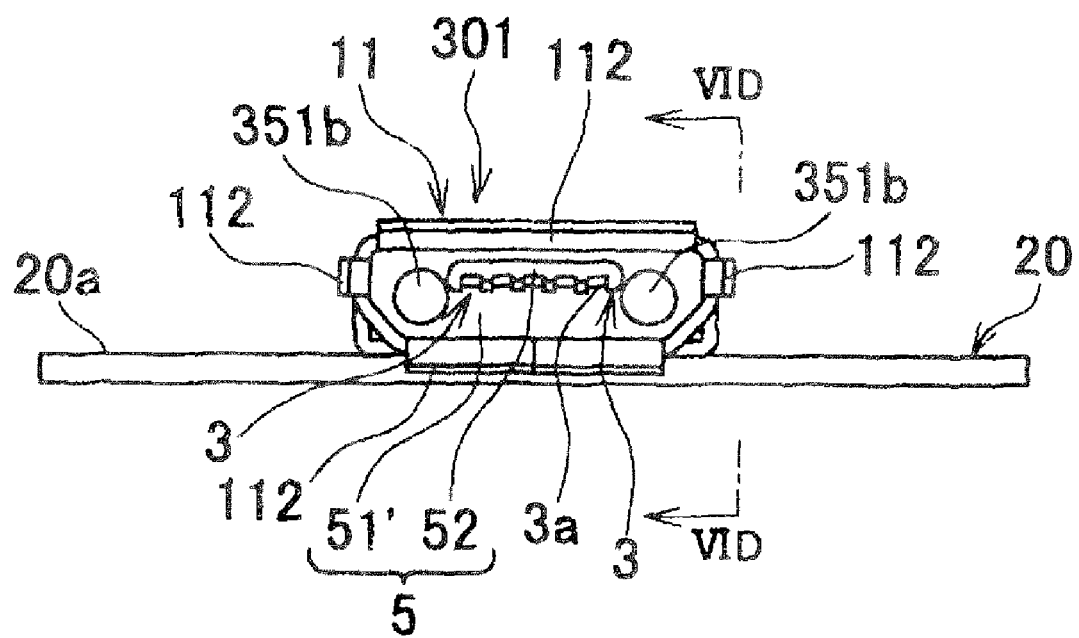
FIG. 6A is a front view of the FIG. 5 connector.
Figure 6B:
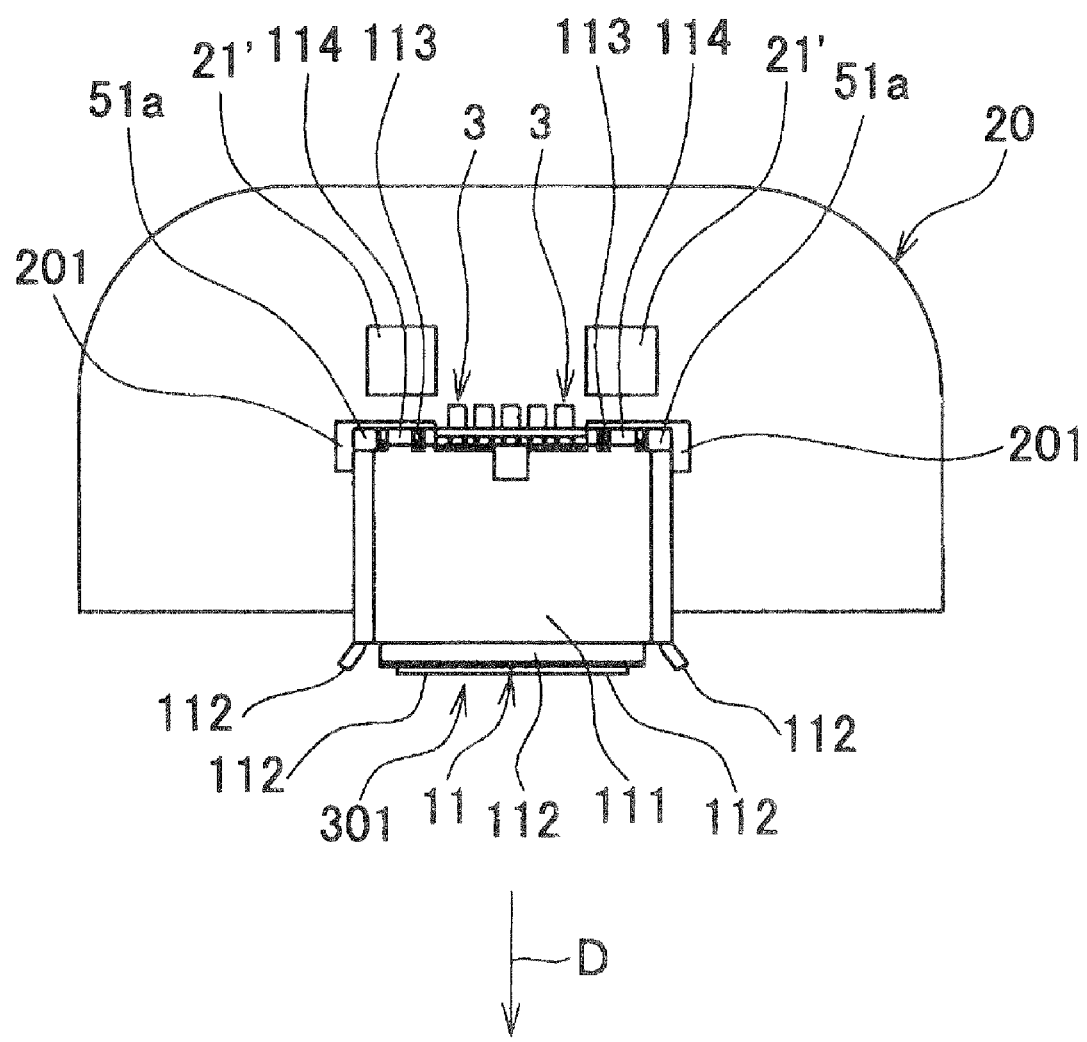
FIG. 6B is a plan view of the FIG. 5 connector.
Figure 6C:
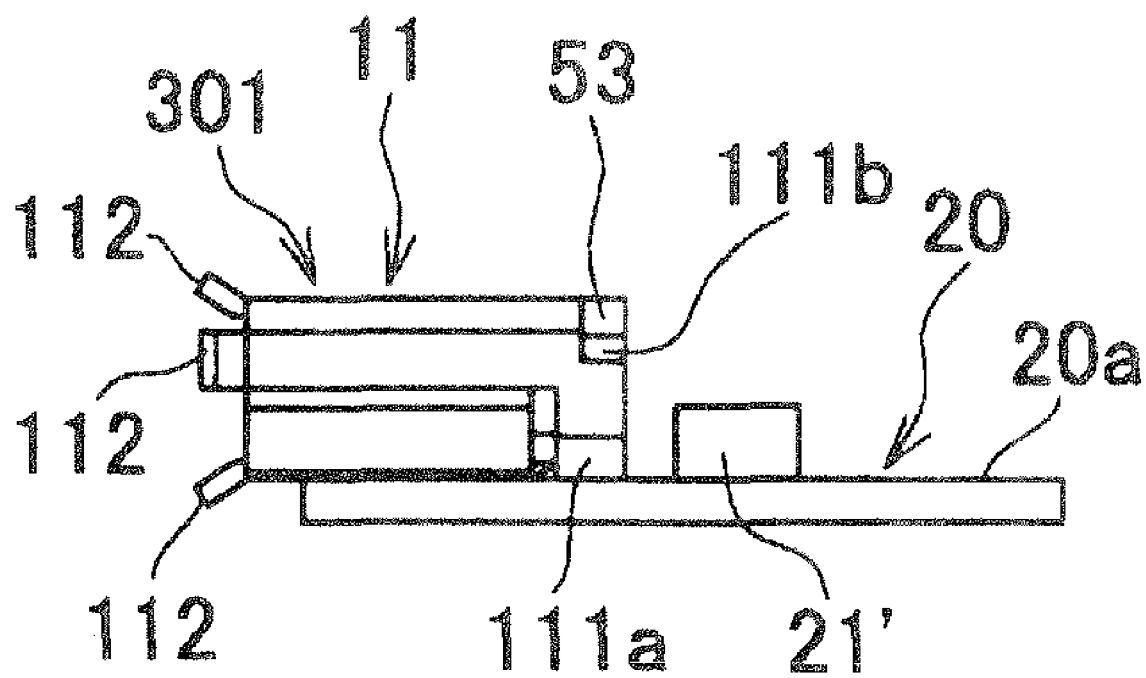
FIG. 6C is a side view of the FIG. 5 connector.
Figure 6D:
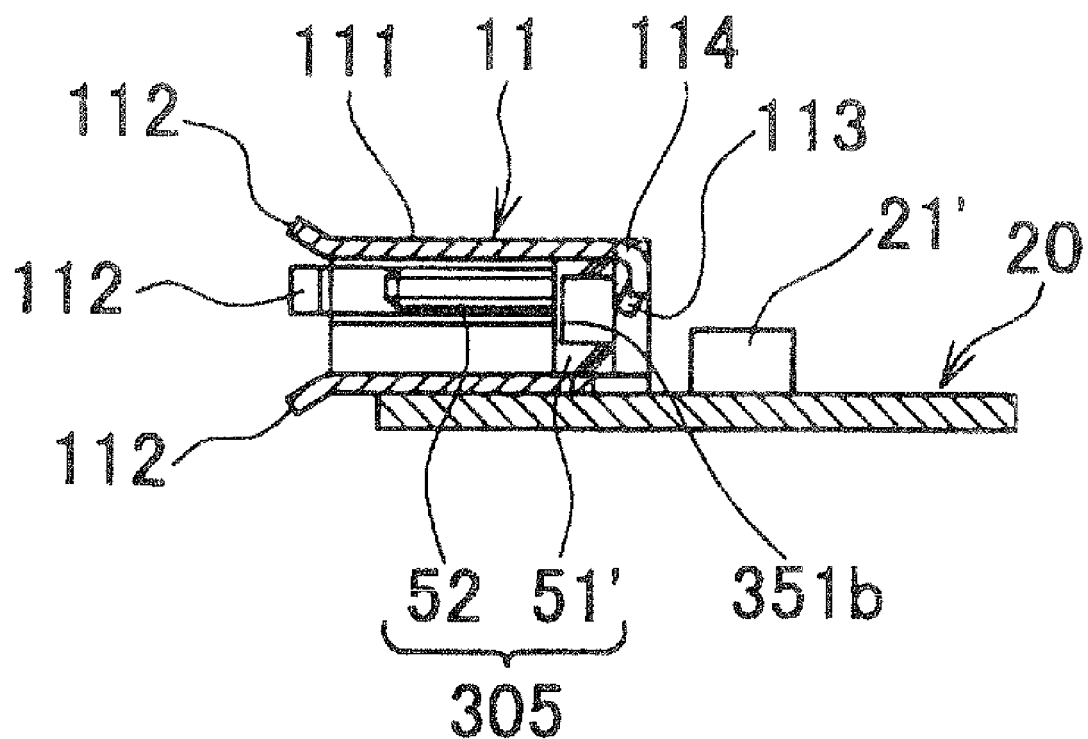
FIG. 6D is a cross-sectional view taken on line VID-VID of FIG. 6A.
Figure 6E:
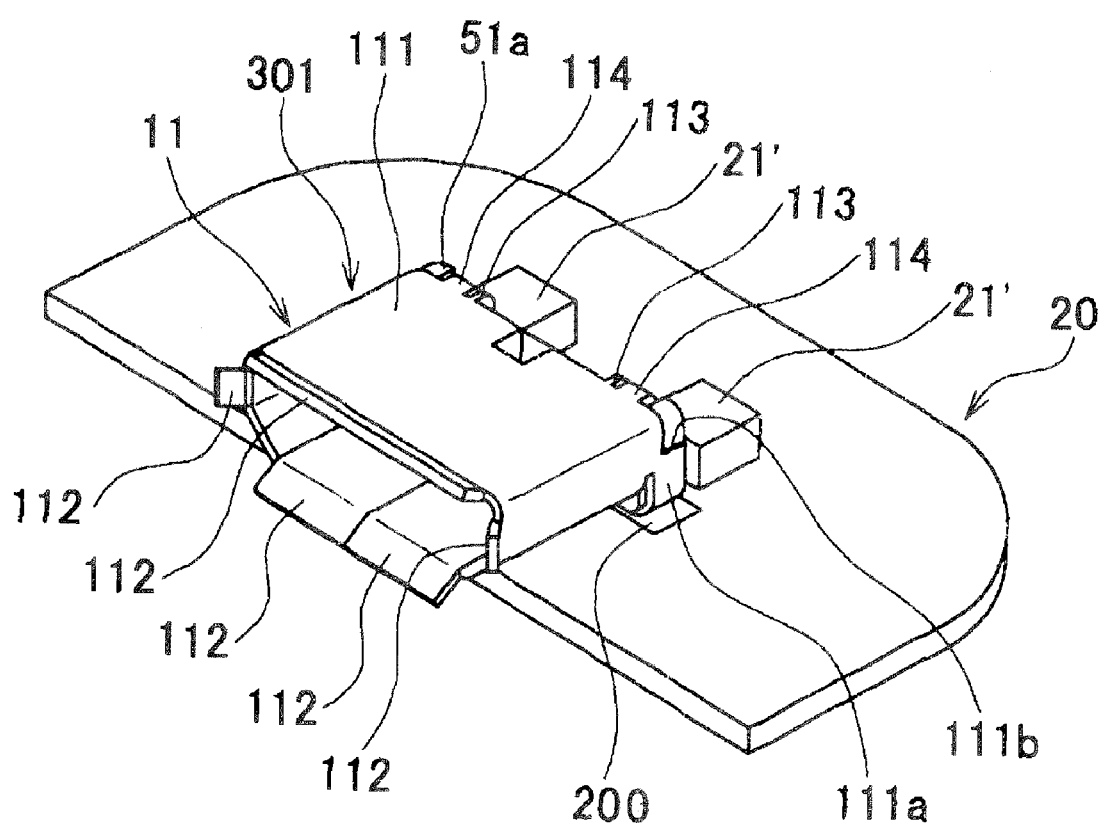
FIG. 6E is a perspective view of the FIG. 5 connector, as viewed in a direction different from the direction in which the connector is viewed in FIG. 5.

The light guide body 71 has a generally hollow cylindrical shape, for accommodating the shield member 11 (see FIG. 2A). The light guide body 71 has an inner surface formed with a plurality of recesses (not shown) extending in the fitting direction D. When the light guide 7 is mounted on the housing 5 via the shield member 11 in the fitting direction D, the recesses prevent the light guide 7 and guides 112, referred to hereinafter, of the shield member 11 from being brought into contact with each other. Cutouts (notches) 71b are formed in a lower portion of the light guide body 71 toward a rear end thereof in the fitting direction D. When the light guide 7 is mounted on the housing 5 via the shield member 11, the LEDs 21 are received in the cutouts 71b, respectively. Further, light emitted from the LEDs 21 enters the light guide 7 through the cutouts 71b, and is emitted from a front surface of the light guide 7 in the fitting direction D. At this time, since the light emitted from the LEDs 21 is also emitted from the outer peripheral surface of the light guide 7, substantially the whole light guide 7 shines.

The protruding portion 72 is connected to a lower portion of the light guide body 71 toward a front end thereof in the fitting direction D. This increases the area of the front of the light guide 7 in the fitting direction D.

The shield member 11 includes a shield member body 111 and the guides 112, and is made of metal.

The shield member body 111 has a generally hollow cylindrical shape. The shield member body 111 is generally D-shaped in cross section. Legs 111a are formed on a lower portion of the shield member body 111 toward a rear end thereof in the fitting direction D. Cutouts 111b are formed in an upper portion of the shield member body 111 toward the rear end thereof in the fitting direction D. The cutouts 111b receive the engaging protrusions 51a of the housing 5. Thus, the housing 5 is accurately positioned (in the fitting direction D) with respect to the shield member 11.

The shield member body 111 has nails 113 and rear walls 114 on respective opposite sides of the rear end thereof in the fitting direction D. After the housing 5 is accommodated in the shield member 11, the nails 113 are bent substantially at right angles toward the housing body 51, whereby the housing 5 is fixed to the shield member 11.

The guides 112 are formed on a front end of the shield member body 111 in the fitting direction D. The guides 112 guide the mating connector into the shield member body 111.

To mount the connector 101 on the printed circuit board 20, first, the shield member 11 in a state having the light guide 7 removed therefrom is disposed at a predetermined position on the printed circuit board 20 (between the two LEDs on the printed circuit board 20).

After that, the terminal portion 3b of each contact 3 is soldered to an associated one of the terminal pads (not shown) of the printed circuit board 20, and the legs 111a of the shield member 11 are soldered to pads 200 of the printed circuit board 20 (see FIG. 1). The soldering of the terminal portions 3b and the legs 111a is performed by a reflow soldering method.

Finally, the light guide 7 is caused to slide from the front side of the shield member 11 to the rear side thereof, to thereby mount the light guide 7 on the shield member 11. When the light guide 7 is mounted on the shield member 11, the light guide 7 is held on the shield member 11 by holding means (e.g. a click stop mechanism), not shown, provided on the light guide 7 and the shield member 11.

The LEDs 21 light or flash e.g. when a battery of a cellular phone is being charged, or when the remaining capacity of the battery of the cellular phone becomes low.

When the LEDs 21 light or flash, light emitted from the LEDs 21 is guided by the light guide 7 forward in the fitting direction D, whereby the front end face of the light guide 7 in the fitting direction D appears as a bright ring.

According to the first embodiment, it is possible to easily view light emitted from the LEDs 21.

Further, since the light guide 7 made of an acrylic resin is removable from the shield member 11, it is possible to reflow solder the shield member 11 to the printed circuit board 20, which facilitates the soldering operation.

Next, a connector 201 according to a second embodiment of the present invention will be described with reference to FIG. 3 and FIGS. 4A to 4E. Component parts identical to those of the connector 101 according to the first embodiment are denoted by identical reference numerals, and detailed description thereof is omitted. Hereafter, a description will be given of only main different parts from those of the first embodiment.

As shown in FIG. 3 and FIGS. 4A to 4E, the connector 201 is comprised of the plurality of contacts 3, the housing 5, a frame 8, a film (light-transmissive portion) 9, and the shield member 11.

The frame 8 includes a first hollow cylindrical portion 81, a second hollow cylindrical portion 82, and a connecting portion (not shown) (see FIG. 4D), and is made of a white LCP (liquid crystal polymer). It should be noted that the LCP may be a light-transmissive one. The second hollow cylindrical portion 82 surrounds the outer peripheral surface of the shield member 11 such that the former is substantially intimate contact with the latter. The first hollow cylindrical portion 81 surrounds the outer peripheral surface of the second hollow cylindrical portion 82 via a hollow cylindrical space G. The first hollow cylindrical portion 81 and the second hollow cylindrical portion 82 are connected by a connecting portion (not shown). The connecting portion has a shape which blocks light emitted from the LEDs 21 as little as possible.

The first hollow cylindrical portion 81 includes a first hollow cylindrical portion body 811 and a protruding portion 812. Cutouts (notches) 811a are formed in a lower portion of the first hollow cylindrical portion body 811 toward a rear end thereof in the fitting direction D. The cutouts 811a communicate with the hollow cylindrical space G. When the frame 8 is disposed at a predetermined position on the printed circuit board 20, the LEDs 21 are received in the cutouts 811a. The protruding portion 812 is connected to the lower portion of the first hollow cylindrical portion body 811 toward a front end thereof in the fitting direction D. This increases the area of the front surface of the frame 8 in the fitting direction D.

The second hollow cylindrical portion 82 has an inner periphery formed with a plurality of recesses (not shown) extending in the fitting direction D. When the frame 8 is mounted on the shield member 11 from forward in the fitting direction D, the recesses prevent the frame 8 and the guides 112 of the shield member 11 from being brought into contact with each other.

The film 9 is white and translucent. The LCP or polyimide is suitable for a material thereof. The film 9 is fixed to a front end of the frame 8 in the fitting direction D.

Since the frame 8 is made of the LCP or the like, which is a heat-resistant material, the connector 201 can be soldered to the printed circuit board 20 in a state in which the frame 8 is mounted on the shield member 11, by the reflow soldering method.

When the LEDs 21 light or flash, light emitted from the LEDs 21 is guided through the hollow cylindrical space G to the front of the frame 8 in the fitting direction D, to pass through the film 9. At this time, the film 9 appears as a bright ring.

According to the second embodiment, the same advantageous effects as provided by the first embodiment are obtained, and since the frame 8 is made of a heat-resistant material, it is possible to solder the connector 201 having the frame 8 mounted thereon to the printed circuit board 20 by the reflow soldering method.

Next, a connector 301 according to a third embodiment of the present invention will be described with reference to FIG. 5 and FIGS. 6A to 6E. Component parts identical to those of the connector 101 according to the first embodiment are denoted by identical reference numerals, and detailed description thereof is omitted. Hereafter, a description will be given of only main different parts from those of the first embodiment.

As shown in FIG. 5 and FIGS. 6A to 6E, the connector 301 is comprised of the plurality of contacts 3, a housing 305, and the shield member 11.

The housing 305 includes a housing body 51' and the contact portion-holding portion 52. The housing body 51' has circular thin portions 351b formed at a rear end thereof in the fitting direction D. The thin portions 351b has a thickness suitable for causing light emitted from the LEDs 21' to pass therethrough.

The housing body 51' of the housing 305 of the connector 301 according to the present embodiment has approximately the same construction as that of the housing body 51 of the housing 5 of the connectors 101 and 201 according to the first and second embodiments. The housing body 51' and the housing body 51 are distinguished from each other in that the former housing body 51' has the thin portions 351b but the latter housing body 51 has no thin portions 351b.

The LEDs 21' emit light in a direction parallel to the mounting surface 20a of the printed circuit board 20.

The connector 301 is mounted on the printed circuit board 20 by the reflow soldering method.

When the LEDs 21' light or flash, light emitted from the LEDs 21' advances forward in the fitting direction D through the thin portions 351b of the housing 305. When the connector 301 is viewed from the front in the fitting direction D, the thin portions 351b emit circular light.

According to the third embodiment, the same advantageous effects as provided by the first embodiment are obtained, and since the thin portions 351b can be formed according to the size of the housing 305, it is possible to increase the size of light-emitting portions (thin portions 351b).

It should be noted that although in the above-described first to third embodiments, the shield member 11 is employed, it is possible to omit the shield member 11.

Further, although in the above-described first embodiment, the light guide 7 is configured to be removable from the housing 5, the light guide 7 is not necessarily required to be removable from the housing 5.

Further, although in the above-described second embodiment, the frame 8 is configured to be removable from the housing 5, the frame 8 is not necessarily required to be removable from the housing 5.

Further, although in the above-described second embodiment, a frame including the first hollow cylindrical portion 81 and the second hollow cylindrical portion 82 is employed as the frame 8, the configuration of the frame 8 is not necessarily limited to this, but any suitable frame may be used insofar as it can form an annular gap between the same and the shield member or the housing.

It should be noted that although the materials of the frame 8 and the film 9 are white, this is not limitative, but they may be of a color other than white, or a light color.

It is further understood by those skilled in the art that the foregoing are the preferred embodiments of the present invention, and that various changes and modification may be made thereto without departing from the spirit and scope thereof.

What is claimed is:

1. A connector comprising:
   contacts;
   a housing that holds said contacts, said housing being arranged on a printed board; and
   a light guide that is mounted on said housing in a manner covering said housing, for guiding light from a light-emitting diode mounted on said printed board, forward of said housing in a fitting direction;
   wherein a notch for accommodating said light-emitting diode and into which the light emitted from said light-emitting diode enters, is formed in a rear-end side, in the fitting direction, of said light guide.

2. The connector according to claim 1, wherein said light guide is removable from said housing from a front of said housing.

3. A connector comprising:
   contacts;
   a housing that holds said contacts, said housing being arranged on a printed board;
   a frame having a first cylindrical portion that surrounds said housing, and a second cylindrical portion that surrounds said housing and surrounds said first cylindrical portion so that a cylindrical space is formed between said first cylindrical portion and said second cylindrical portion, wherein a notch for accommodating a light-emitting diode mounted on said printed board is formed in said first cylindrical portion, said notch being in communication with the cylindrical space; and
   a light-transmissive portion that is supported by a front end portion, in a fitting direction, of said first and second cylindrical portions, for causing light emitted from said light-emitting diode and introduced to said cylindrical space to pass forward of said housing in the fitting direction.

4. The connector according to claim 3, wherein said frame is removable from said housing from a front of said housing.

5. A connector comprising:
   contacts; and
   a housing that holds said contacts, said housing being arranged on a printed board; and
   wherein said housing has a thin portion at which a thickness of said housing allows light to pass therethrough, for causing light from a light-emitting diode mounted on said printed board to pass forward of said housing in a fitting direction.

6. The connector according to claim 1, wherein said light guide comprises a substantially cylindrical light guide main body for accommodating said housing, and a protruding portion coupled to a lower portion of a front-end side of said light guide main body in the fitting direction.

7. The connector according to claim 2, wherein a shield member is mounted on said housing;
   wherein said shield member comprises a substantially cylindrical shield member main body for accommodating said housing, and a plurality of leading elements for leading a matching connector into said shield member main body, the plurality of leading elements being formed on a front end of the shield member main body in the fitting direction; and
   wherein said light guide is removably mounted on said housing via said shield member.

8. The connector according to claim 3, wherein said first cylindrical portion comprises a first cylindrical portion main body for accommodating said housing, and a protruding portion coupled to a lower portion of a front-end side of said first cylindrical portion main body in the fitting direction.

9. The connector according to claim 4, wherein a shield member is mounted on said housing;
   wherein said shield member comprises a substantially cylindrical shield member main body for accommodating said housing, and a plurality of leading elements for leading a matching connector into said shield member main body, the plurality of leading elements being formed on a front end of the shield member main body in the fitting direction; and
   wherein said frame is removably mounted on said housing via said shield member.

10. The connector according to claim 5, wherein a shield member is mounted on said housing.

* * * * *